(12) United States Patent
Spittle et al.

(10) Patent No.: US 9,502,047 B2
(45) Date of Patent: Nov. 22, 2016

(54) TALKER COLLISIONS IN AN AUDITORY SCENE

(71) Applicant: Dolby Laboratories Licensing Corporation, San Francisco, CA (US)

(72) Inventors: Gary Spittle, Hillsborough, CA (US); Michael Hollier, San Carlos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 248 days.

(21) Appl. No.: 14/373,336

(22) PCT Filed: Mar. 21, 2013

(86) PCT No.: PCT/US2013/033366
§ 371 (c)(1),
(2) Date: Jul. 18, 2014

(87) PCT Pub. No.: WO2013/142727
PCT Pub. Date: Sep. 26, 2013

(65) Prior Publication Data
US 2015/0012266 A1    Jan. 8, 2015

Related U.S. Application Data

(60) Provisional application No. 61/614,577, filed on Mar. 23, 2012.

(51) Int. Cl.
*G10L 21/0232* (2013.01)
*G10L 21/003* (2013.01)
(Continued)

(52) U.S. Cl.
CPC ......... *G10L 21/0232* (2013.01); *G10L 21/003* (2013.01); *G10L 21/0205* (2013.01); *G10L 21/0272* (2013.01); *G10L 25/48* (2013.01); *H04M 3/568* (2013.01); *G10L 25/18* (2013.01)

(58) Field of Classification Search
CPC . G10L 21/0232; G10L 21/003; G10L 25/18; G10L 21/0205; G10L 21/0272; G10L 25/48; H04M 3/568
USPC ........ 704/206, 209, 211, 250, 266, 267, 268
See application file for complete search history.

(56) References Cited

U.S. PATENT DOCUMENTS 7,391,877 B1    6/2008  Brungart
7,636,448 B2   12/2009  Metcalf
(Continued)

FOREIGN PATENT DOCUMENTS

| JP | 2005-267667 | 9/2005 |
|----|-------------|--------|
| JP | 2010-534956 | 11/2010 |
| WO | 2009/001035 | 2/2009 |

OTHER PUBLICATIONS

Takafumi Koshinaka, et al "Voice Recognition System for Lay Judge System", NEC Technical Report, Japan, NEC Corporation, Feb. 2010, vol. 63, No. 1, pp. 47-49.
(Continued)

*Primary Examiner* — Thierry L Pham (57) ABSTRACT

From a plurality of received voice signals, a signal interval in which there is a talker collision between at least a first and a second voice signal is detected. A processor receives a positive detection result and processes, in response to this, at least one of the voice signals with the aim of making it perceptually distinguishable. A mixer mixes the voice signals to supply an output signal, wherein the processed signal(s) replaces the corresponding received signals. In example embodiments, signal content is shifted away from the talker collision in frequency or in time. The invention may be useful in a conferencing system.

19 Claims, 3 Drawing Sheets

(51) Int. Cl.
    *H04M 3/56* (2006.01)
    *G10L 21/02* (2013.01)
    *G10L 21/0272* (2013.01)
    *G10L 25/48* (2013.01)
    *G10L 25/18* (2013.01)

(56) References Cited

U.S. PATENT DOCUMENTS

| | | |
|---|---|---|
| 7,970,115 B1 | 6/2011 | Coughlan |
| 2008/0084981 A1 | 4/2008 | Lee |
| 2008/0144794 A1 | 6/2008 | Gardner |
| 2008/0298610 A1 | 12/2008 | Virolainen |
| 2009/0150151 A1 | 6/2009 | Sakuraba |
| 2009/0310444 A1 | 12/2009 | Hiroe |
| 2010/0142327 A1 | 6/2010 | Kepesi |
| 2010/0235169 A1 | 9/2010 | Harma |
| 2011/0106825 A1 | 5/2011 | Xiang |
| 2011/0109798 A1 | 5/2011 | McReynolds |
| 2012/0029915 A1 | 2/2012 | Tsujikawa |

OTHER PUBLICATIONS

Ohno, T. et al "Respiratory Motion Analysis for Sequential Chest MR Images based on Multiple Breathing Patterns" ITE Technical Report, Japan, ITE Association, Feb. 24, 2007, vol. 31, No. 14, pp. 55-58.

Heli, H. et al. "Localization of Multiple Simultaneous Sound Sources in Reverberant Conditions Using Blind Source Separation Methods" 2011 International Symposium on Artificial Intelligence and Signal Processing, Jun. 15-16, 2011, pp. 1-5.

TALKER COLLISIONS IN AN AUDITORY SCENE

CROSS-REFERENCE TO RELATED APPLICATIONS

This application claims the benefit of priority U.S. Provisional Patent Application Ser. No. 61/614,577 filed on 23 Mar. 2012, hereby incorporated by reference in its entirety.

TECHNICAL FIELD

The invention disclosed herein generally relates to audio communication technique, and more precisely to an audio mixing method allowing two or more voice signals to be combined while preserving the intelligibility of each signal. It is presently intended to apply the invention to voice communication devices, including conferencing endpoints, in which talker collisions are expected to occur.

BACKGROUND OF THE INVENTION

Multi-party voice communication systems, such as digital or analogue voice conference or video conference systems, mix (e.g., combine, in particular by additive mixing) live signals originating from different system endpoints to approximate the sound that would have been heard if all the communicating parties had been present in one location. It is a common experience—and partly due to the fact that the parties are able to interact via sound or limited view angles only—that voices are harder to separate and more difficult to understand than in a real-life conversation. In particular, talker collisions may be more frequent.

US 2008/144794 is directed to the problem of separating speakers in an online conference. According to that application, the problem can be alleviated by conceptually locating the speakers in a virtual environment and simulating their distances, azimuth angle and elevation angle with respect to the listener by adding spatial cues to the voice signals in accordance with their points of origin in the virtual environment. The spatial cues discussed in US 2008/144794 include total intensity, inter-ear intensity ratio, ratio of direct and reflected sound, head-shadow azimuthal effects, pinna-induced frequency filtering and similar monaural and binaural effects. It is well known that the human sense of hearing resolves speech collisions easier if the speakers are (seemingly) separated in space.

It would be desirable to develop further techniques enhancing the intelligibility of speech in a mixed voice signal.

BRIEF DESCRIPTION OF THE DRAWINGS

Example embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DESCRIPTION OF EMBODIMENTS OF THE INVENTION

I. Overview

It is an object of the present invention to improve the intelligibility of voice signals in a mixed signal. In particular, it is an object to improve conditions expected to influence a listener's ability to decode spoken natural language carried by the mixed signal. It is another object to mitigate talker collisions in a mixed voice signal. It is a further object of the invention to reduce adverse effect of simultaneous speech in a mixed voice signal.

Accordingly, example embodiments of the invention provide methods, devices and computer-program products with the features set forth in the independent claims.

In an example embodiment, a system node receives a plurality of voice signals having a common time base. The node detects a signal interval in which there is a talker collision involving two or more voice signals. By virtue of the common time base, it is immaterial whether the interval is expressed in relation to the first or second voice signal or one of the others. If a talker collision is detected, the node processes one of the voice signals (referred to as "first" voice signal in the claims) to make it perceptually distinguishable. The processed first signal replaces the received first signal as input to a subsequent mixing stage, which supplies an output signal from the node.

The common time base may be tied to data packages used for transmitting the data of the incoming voice signals and carrying timestamps relating them to a system-wide master clock time. This way, a particular packet may be related to a point or interval in the time base by parsing (or reading) a data field carrying the timestamp of the packet. Alternatively, the common time base is indicated by a synchronization signal. Further alternatively, the time base does not rely on information in the incoming voice signals. Instead, voice signals are mixed by combining parallel segments of equal length from each of the voice signals in a continuous fashion (wherein a segment may, e.g., correspond to one data packet), which implies a synchronicity relationship between the signals. As a consequence, each uninterrupted segment of the output signal has been obtained by choosing a starting point (e.g., initial data packet), after which segments are combined normally without time stretch or time compression, so that all segments have equal length, e.g., 20 ms. Then, the relative positions of the voice signal segments represent a common time base.

In a packetized voice signal, the signal interval in which there is a detected talker collision may correspond to a collection of entire data packets.

The node may be configured to detect simultaneous voice activity in two or more voice signals. The sought-for simultaneous voice activity is simultaneous with respect to the common time base. A more limited detection criterion may be to look for simultaneous voice activity in a particular frequency range of each signal. Alternatively or additionally, the node considers intervals with simultaneous voice activity and applies, within these intervals, at least one more additional detection criterion chosen from voice signal characteristics known to indicate intelligibility issues, such as presence of certain combinations of phonemes, combinations of voiced and unvoiced speech etc.

The processing of the first voice signal has as one of its general aims to make the signal more distinguishable. Through the processing, therefore, the signal content may be possible to discern in spite of interference from the colliding signal. The processing may include changing the properties of the first signal in such manner that it differs to a greater extent from the signal(s) with which it collides. Alternatively or additionally, it may include changing the signal content in such manner that the collision is less severe and information loss becomes less likely. According to the former approach, the mixed signal may contain an equal amount of talker collisions (and of the same severity) as it would do without processing, but it has been supplied with cues expected to simplify the cognitive processes responsible for decoding a captured sound wave into language. In contrast hereto, the latter approach does not rely on cognitive abilities of the human brain but is hoped to reduce the amount of overlapping content in the mixed signal a priori.

The processing of the first voice signal may proceed in the signal interval containing the talker collision only. Alternatively, the processing may concern a larger interval containing the collision interval. In particular, if a particular effect is to be applied in the collision interval, the processing may include gradual transitions over time, allowing smooth onset and release of the effect.

This example embodiment applies processing selectively and may therefore achieve at least one of the objects of the invention. More precisely, because the processing is restricted to time segments in which it is actually needed, more targeted processing can be applied. Further, since any adverse side effects on the perceived audio quality are confined in these intervals, the node may use more radical and possibly more efficient processing techniques.

In an example embodiment developing the preceding one further, the processing includes taking signal content from the detected signal interval (i.e., where the talker collision occurs) from the first signal and time-shifting the content to a different interval of the first signal. The choice of a suitable target location, both for time-shifting and frequency-shifting embodiments, will be discussed in greater detail below.

In this connection, the time shift may be achieved by time-stretching the signal content with respect to the common time base. To achieve a forward shift, a segment of the signal extending up to an approximate location of a reference point in the detected interval (e.g., beginning, centre, end of the interval) undergoes negative time stretch (i.e., retardation) and/or a segment extending from the approximate location of a reference point in the detected interval undergoes positive time stretch (i.e., acceleration). To achieve a backward shift, the positive time stretch segment precedes the negative time stretch segment. In either case, positive and negative stretch may cancel, so that the net time stretch is close to zero. The amount of stretching preferably varies gradually over time, to make the processing less noticeable. The stretching preferably does not change the pitch of the first signal.

Alternatively, a time shift can be achieved by copying the signal content in the detected interval to an adjacent signal interval. The adjacent signal interval need not be contiguous with the detected signal interval, but is preferably located in proximity thereof. For normal to fast speech rates (up to about 10 English syllables per second), the adjacent interval is preferably located at most 50 ms away from the detected interval. This maximum duration is preferably reduced further if a higher speech rate is expected, e.g., to 25 ms. The copying of signal content may be accompanied by removal or attenuation (e.g., downscaling) of this signal content in the detected interval. The attenuation is preferably gradual, having its maximally downscaled portion located in the detected interval, so as to avoid abrupt transitions. The signal content extracted from the detected interval may be copied into the adjacent interval by additive mixing. As an example, in a transform-coded signal, transform coefficient values may be added to those already present in the adjacent interval. Additionally or alternatively, the signal content already present in the adjacent interval may be pre-attenuated before the transform coefficients are incremented by extracted signal content. Again, to promote a smooth transition into and out of the adjacent interval, the onset and/or release of the copied signal content—as well as the pre-attenuation of the adjacent interval—is made gradual with time. This type of time shift technique is particularly useful if there is no significant pitch movement in the first signal between the adjacent and the detected interval. It may also be advantageous to use this technique in an interval dominated by unvoiced (or non-tonal or noise) speech, as may be evidenced, e.g., by the absence of a dominating fundamental pitch frequency.

In an example embodiment, the processing includes taking signal content in the detected signal interval (i.e., where the talker collision occurs) from the first signal and frequency-shifting the content to a different interval of the first signal. The frequency shift may optionally be combined with a time shift of the signal content. Preferably, the frequency shift proceeds gradually over time. For instance the shift may include a ramp-up phase, a constant phase and a ramp-down phase. During the ramp-up and ramp-down phases, the frequency shift may vary linearly in logarithmic frequency units over time. To prevent the frequency shift from being too noticeable, the maximal frequency shift preferably does not exceed an octave and is more preferably less than a quarter of an octave.

Reference is now made to all the preceding example embodiments that include a time shift or a frequency shift. The shift may affect the entire signal content in the detected signal interval or may alternatively be restricted to a limited frequency range or union of frequency sub-ranges. The shift may in particular move the signal content from the talker collision location to a target location in the first signal, where it is expected to collide to a lesser extent with the signal content of other signal.

Additionally or alternatively, the detected signal interval is adjusted in accordance with the linguistic structure carried by the first voice signal. In particular, the first signal may be segmented (e.g., in a portion including the detected signal interval) into phonemes. Computer-aided methods for phoneme segmentation are known per se in natural language processing. A phoneme segmentation algorithm may annotate the first voice signal with phoneme boundaries; in a packetized voice signal, the phoneme boundaries may for instance coincide with packet boundaries. Based on this information, the left endpoint of the detected signal interval is extended or truncated, and the right endpoint of the detected signal interval is extended or truncated, in such manner that the detected signal interval covers complete phonemes only. Put differently, after this extension and/or truncation, the endpoints of the detected signal interval coincide with the approximate locations of phoneme boundaries. An adjustment of this type is believed to make a time or frequency shift less noticeable.

In an example embodiment, the detection of talker collisions is based on indicators of the energy content per frequency band for each of the voice signals. An energy indicator may be readily available in a bitstream representing a voice signal, e.g., it can be read from a data field in the bitstream. Alternatively, an energy indicator is computed on the basis of a quantity representing the voice signal, such as a sequence of transform coefficients. The computation of the indicator may include weighting in accordance with a hearing sensitivity curve. Based on the energy content indicator, the detection may apply a condition including having comparable energy content in the first and the second voice signals (i.e., the signals involved in the talker collision). The location in which such comparable energy content is found is referred to in the claims as a talker collision location. It may for instance be represented as a rectangle in the time-frequency plane; preferably it has the same shape and size in the time-frequency plane as the area for which the detection condition(s) was (were) found to be fulfilled. The condition of having comparable energy content may be considered equivalent to having bounded difference between the energy content indicator for the first signal and the energy content indicator for the second signal. The inventors have realized that occurrences of comparable signal energy in two mixed signals may correspond to a spot where intelligibility is reduced.

In a further development of the preceding example embodiment, the comparable-energy condition is combined with an additional condition formulated in terms of the energy-content indicator. The additional condition may stipulate that the energy content indicator is to exceed a predefined threshold for all colliding signals. The inventors have realized that talker collisions are generally less disturbing in (frequency ranges of) time segments where the signal power is low; such talker collisions may be left uncorrected without noticeable detriment.

The energy content indicator referred to above is preferably frequency-dependent. Hence, it permits a comparison not only of total signal energy values but also of signal energy values for a given frequency band separately. In particular, the voice signal may be partitioned into time-frequency tiles. A tile may be one of a plurality of predefined frequency bins in a time frame of a signal. In this context, the one or more detection criteria may be applied to groups of corresponding tiles, namely tiles belonging to different voice signals and having corresponding time and frequency coordinates. Thus, a time-frequency tile is the basic detection unit and therefore the resolution of the detection. Hence, a talker collision location is composed of one or more time-frequency tiles. In particular, a value of the energy content indicator may be computed for each time-frequency tile.

Reference is again made to the preceding example embodiments that include a time shift or a frequency shift. Advantageously, a condition of least energy content (e.g., according to the energy content indicator discussed above) is used to select that voice signal, out of a plurality of voice signals involved in a talker collision, which is to undergo processing. The inventors have realized that this condition may enable a less noticeable time shift and/or frequency shift. Alternatively, this signal selection may be guided by the availability of relatively more advantageous target locations, as discussed next.

Furthermore, a target location, to which spectral content in the detected interval may be shifted, may be obtained as a by-product of the process of detecting talker collisions. The target location may be represented as a combination of a frequency interval (or frequency sub-range) and a time interval of the first voice signal. More precisely, the detection process may be configured to return a target location which is close to the talker collision location and in which the detection condition fails. Because the condition fails, the target location is necessarily distinct from the talker collision location. To make the time or frequency shift as little noticeable as possible, preferably, the target location is to be localized as close as possible from the talker collision location. The detection process may be configured to look for target locations having same time interval (i.e., pure frequency shift) or having same frequency interval (i.e., pure time shift). Additionally or alternatively, the detection process may be configured to consider target locations having a congruent time interval or a congruent frequency interval. The congruence of the intervals may entail having equal lengths. In particular, the congruence of two frequency intervals may entail having equal lengths in logarithmic frequency units, such as octaves or decades.

In a setting similar to the one described in the preceding paragraph, the detection process may return more than one candidate target location. Then, a condition in terms of a shift distance metric may be used to select that target location of the candidate target locations to which it is most suitable to shift the talker collision location. The shift distance metric may be a combination of the time shift distance and the frequency shift distance, e.g., the Pythagorean distance. In this connection, the frequency shift may be expressed in linear units or logarithmic units. Alternatively, the frequency shift contribution may be perceptually weighted, e.g., being the area under the relevant segment of a hearing sensitivity curve plotted as function of linear or logarithmic frequency units. The frequency-shift contribution to the shift distance metric may be given relatively higher weight than the time-shift contribution, considering that a frequency shift typically is more computationally complex and unnatural-sounding, at least if the shift amount is large. A simplified version of this condition can be applied to select either a target location requiring a positive pure time (or frequency) shift or a target location requiring a negative pure time (or frequency) shift: that target location which requires the shortest shift amount (in seconds, Hz, octaves or the like) is selected. Moreover, the availability of target locations and their associated shift distance metrics may be used to select that voice signal out of two or more colliding voice signals which is to undergo processing. Put differently, the status as "first voice signal" may be assigned after target locations have been identified and rated in terms of the shift distance metric. As noted above, the shift distance metric may reflect any preference given to time shifts in relation to frequency shifts, so that the selection of a signal which is to undergo processing is taken into account how noticeable the shift is expected to be. This may contribute further to the perceptual discreetness of the time or frequency shift.

In an example embodiment, a detected talker collision is handled by processing the first voice signal by applying one of: harmonic excitation, an oscillating effect, tremolo, vibrato, chorus, flanging and phasing. The processing may affect more than one signal but, to promote the distinctness of the signals is preferably not to affect all voice signals. For instance, this embodiment may include forming a first and a second group of voice signals, wherein the first group but not the second group is to undergo processing. Preferably, two voice signals for which a talker collision has been detected are assigned to different groups. Hence, the colliding signals may become more distinct and more easily distinguishable by virtue of the processing.

In an example embodiment, a device for mixing voice signals while mitigating talker collisions includes a collision detector, a processor operable to process one or more voice signals in response to a positive detection result and a mixer for combining the voice signals into output signals. Any voice signal having undergone processing replaces the same voice signal as received as input to the mixer. The device optionally includes an interface for receiving the voice signals; further optionally, it includes an interface for supplying the output signal generated by the mixer.

In an example embodiment, a combination of the features described above are deployed in a live conferencing system, that is, a conferencing system operating in real time.

The dependent claims define example embodiments of the invention, which are described in greater detail below. It is noted that the invention relates to all combinations of features, even if the features are recited in different claims.

II. Example Embodiments

Figure 1:
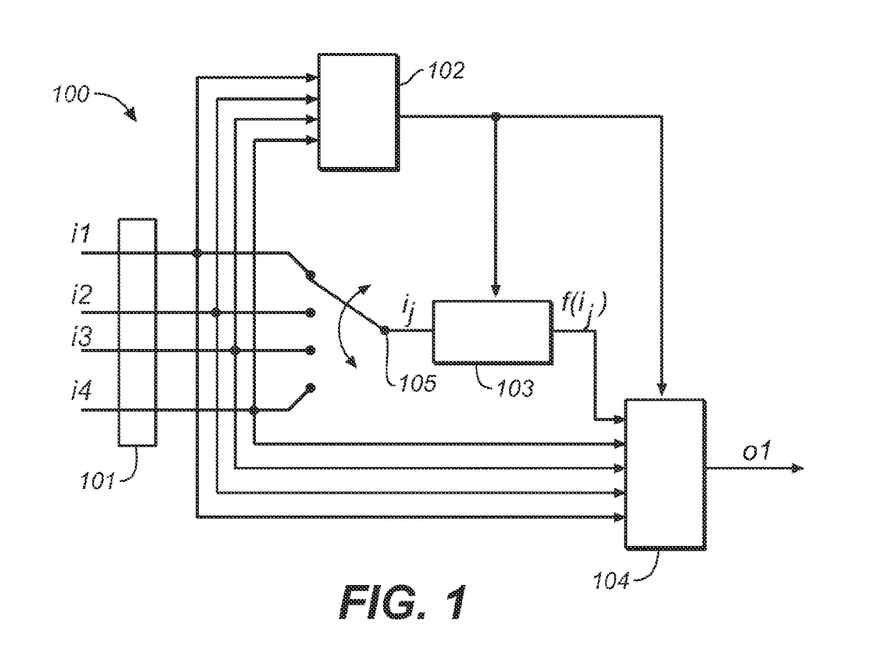
FIG. 1 is a generalized block diagram of a voice signal mixer in accordance with an example embodiment of the invention.

FIG. 1 shows a voice signal mixing device 100 in accordance with an example embodiment of the invention. Input voice signals i1, i2, i3, i4 are received at an interface 101. The interface 101 may be a network interface towards a packet-switched network (not shown), from which the mixing device 100 receives the input voice signals as packetized bitstreams. In the mixing devices 100, each input voice signal i1, i2, i3, i4 is supplied to a collision detector 102, a mixer 104 and a selector 105 operable to forward a selected voice signal(s) $i_j$ to a processor 103 located downstream of the selector 105. In FIG. 1, the selector 105 is symbolically illustrated by a multi-position single-pole switch. The invention is not limited to the simplified case suggested by FIG. 1; for instance, it is envisaged that more than one input voice signal may undergo processing in response to a positive talker collision detection result.

The collision detector 102 is configured to detect a signal interval in which there is a talker collision between two or more of the input voice signals i1, i2, i3, i4. To this end, the collision detector 102 may derive (i.e., compute or read) an energy content indicator for each time-frequency tile of each voice signal and to look for co-occurrences of comparable indicator values, as discussed above. The detection result is supplied to the processor 103 and the mixer 104. In response to a positive detection result, the processor 103 initiates processing of one of the colliding signals, denoted by $i_j$, which may be selected by means of the selector 105. The processor 103 supplies the processed signal $f(i_j)$ to the mixer 104, where it replaces signal $i_j$ as input. Hence, to provide an output signal containing contributions from all input signals, the mixer 104 additively mixes voice signals $i_k$ for all $j \neq k$ as they were received and processed voice signal $f(i_j)$. It is understood that the mixer 104 may be configured to produce other combinations as well. For instance, it may be desired to exclude $i_m$ (and $f(i_m)$ if applicable) from a specialized output mix signal intended for an $m^{th}$ endpoint.

Figure 2:
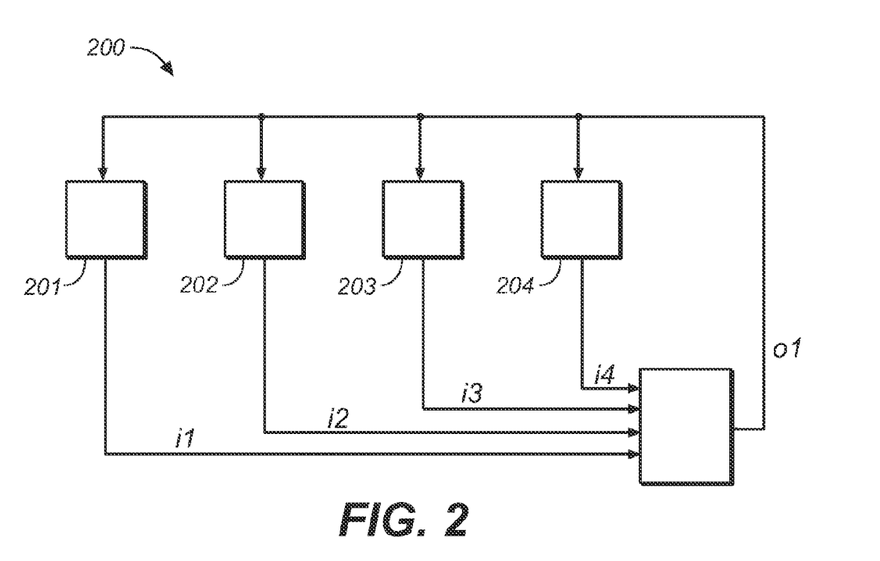
FIG. 2 shows a voice communication system including the voice signal mixer of FIG. 1.

As illustrated in FIG. 2, the voice signal mixing device 100 discussed above may form part of a conferencing system 200 including endpoints 201, 202, 203, 204. The input voice signals i1, i2, i3, i4 may be obtained by means of transducers (e.g., microphones) arranged at respective endpoints 201, 202, 203, 204. In a simple configuration, the mixing device 100 supplies all endpoints 201, 202, 203, 204 with a common output signal o1, which is reproduced by audio sources (e.g., loudspeakers) at the endpoints 201, 202, 203, 204. As noted, the mixing devices 100 may alternatively be configured to supply sub-groups of the endpoints 201, 202, 203, 204 with individual output mix signals. The conferencing system 200 may be a pure voice communication system, a video communication system or a multimedia communication system.

Figure 3:
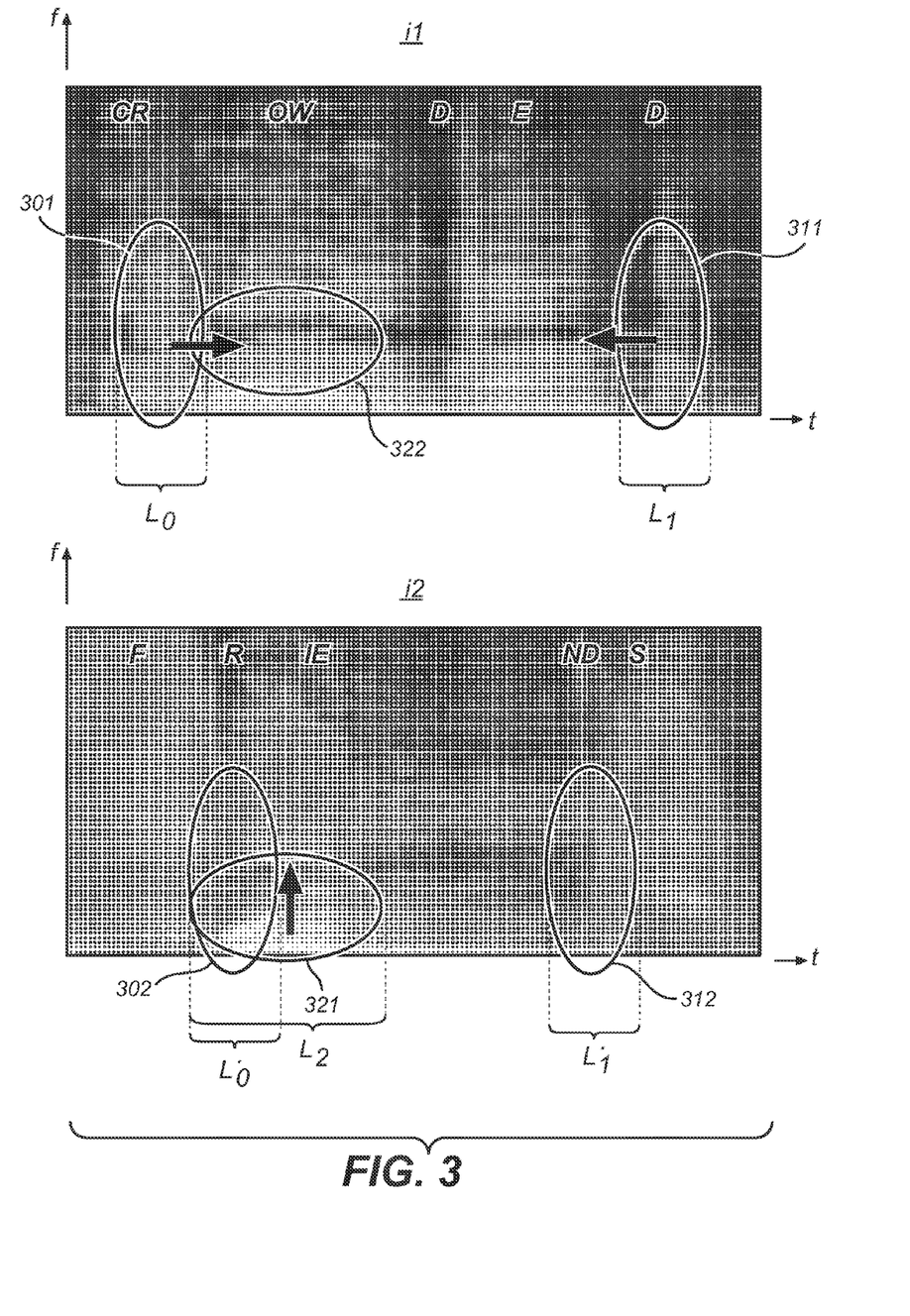
FIG. 3 is a spectrogram (0.6 seconds×21 000 Hz) recorded in a time segment where a talker collision is occurring, wherein three corrective actions that may be taken to increase intelligibility of each voice are illustrated.

FIG. 3 illustrates time shifts and frequency shifts, which are two of the corrective measures proposed by example embodiments of the invention to mitigate the effects of a talker collision. FIG. 3 contains two spectrograms each covering frequencies up to about 21 000 Hz and extending over about 0.6 seconds (corresponding to about 30 time frames of 20 ms each), wherein the upper spectrogram relates to input voice signal i1 and the lower to input voice signal i2. The black areas of the spectrogram correspond to time-frequency tiles with zero energy content, whereas brighter shades indicate non-zero energy content. Relatively brighter regions correspond to relatively higher energy content. For illustrative purposes, each spectrogram has been annotated with graphemes CR-OW-D-E-D, F-R-IE-ND-S corresponding to the phonemes that are carried by the voice signals in the plotted time intervals; it is repeated that the knowledge of the phonemes in the voice signals is not an essential feature of the present invention, nor is knowledge of the locations of the phoneme boundaries.

In the case illustrated by FIG. 3, a talker collision has been detected in a first talker collision location 301, which has been drawn in the upper spectrogram (i1 signal); it could equally well have been drawn in the lower spectrogram (i2 signal) or both spectrograms, since the collision is based on fulfillment of a condition in terms of both signals. It has been found suitable to shift the spectral content of the i1 signal forward in time into a first target location 302. The arrow starting in the first talker collision 301 corresponds in size and direction to the intended time shift. The first target location 302 has been drawn in the lower spectrogram with the aim of illustrating that the i2 signal has low energy content in the first target location. The choice to draw the first target location 302 in the lower spectrogram is not intended to suggest that the spectral content from the first talker collision location 301 is to be moved from the i1 signal to the i2 signal; probably however, this would have little impact on the final mix signal to be produced. It is pointed out that the shapes of the talker collision locations 301, 311, 321 in FIG. 3 are approximate and may be refined into the exact locations where the detection criterion was found to be fulfilled by the collision detector 102. In a simplified approach without frequency selectivity, the first talker collision location 301 and the first target location 302 may be two congruent time segments, respectively denoted by $L_0$ and $L_0'$ in the figure.

The target location 302 may be selected as a region of the time-frequency plane which is congruent with the region where the talker collision is detected and in which the detection condition fails. The condition may be false throughout the target location 302 or at least in a predefined percentage of the target location 302. The target location 302 is preferably localized as close as possible to the talker collision location 301. The voice signal mixing device 100 may be adapted to refrain from a time or frequency shift unless the target location 302 can be localized close in absolute terms, that is, without implying a time shift of more than about 50 ms or a frequency shift of more than about half an octave. As discussed above, these restrictions may be tightened further in particular situations, e.g., to 25 ms and a quarter of an octave.

As discussed above, the processor 104 may accomplish the time shift by a applying a negative and then a positive time shift. Alternatively, it may be achieved by a cut-and-paste (or attenuate-and-paste) technique. It is understood that the time shift operations may incur an algorithmic delay in the voice mixing device 100. The delay will be of the order of the longest possible positive time stretch. It is therefore expected not to increase the total delay in a conferencing system noticeably.

FIG. 3 further shows a second talker collision location 311 and an associated target location 312, these locations being contained in time segments $L_1$, $L_1'$. In terms of phonemes, the talker collision corresponds to a simultaneous realization of phonemes [d] and [s]. As shown in the figure, the intended remedy for the second talker collision is a negative time shift.

Furthermore, a third spectral collision location 321 has been drawn in the lower spectrogram. An associated third target location 322, at the same time segment $L_2$ as the third spectral collision location 321, has been drawn in the upper spectrogram to illustrate that the intended new location of the signal content from third spectral collision location 321 will be shifted to a region with relatively low energy content. As can be seen in FIG. 3, the third spectral collision location 321 is surrounded by time segments where the i1 signal has relatively high energy content in the concerned frequency range, so that neither a positive nor a negative time shift would be suitable to resolve the collision.

Figure 4:
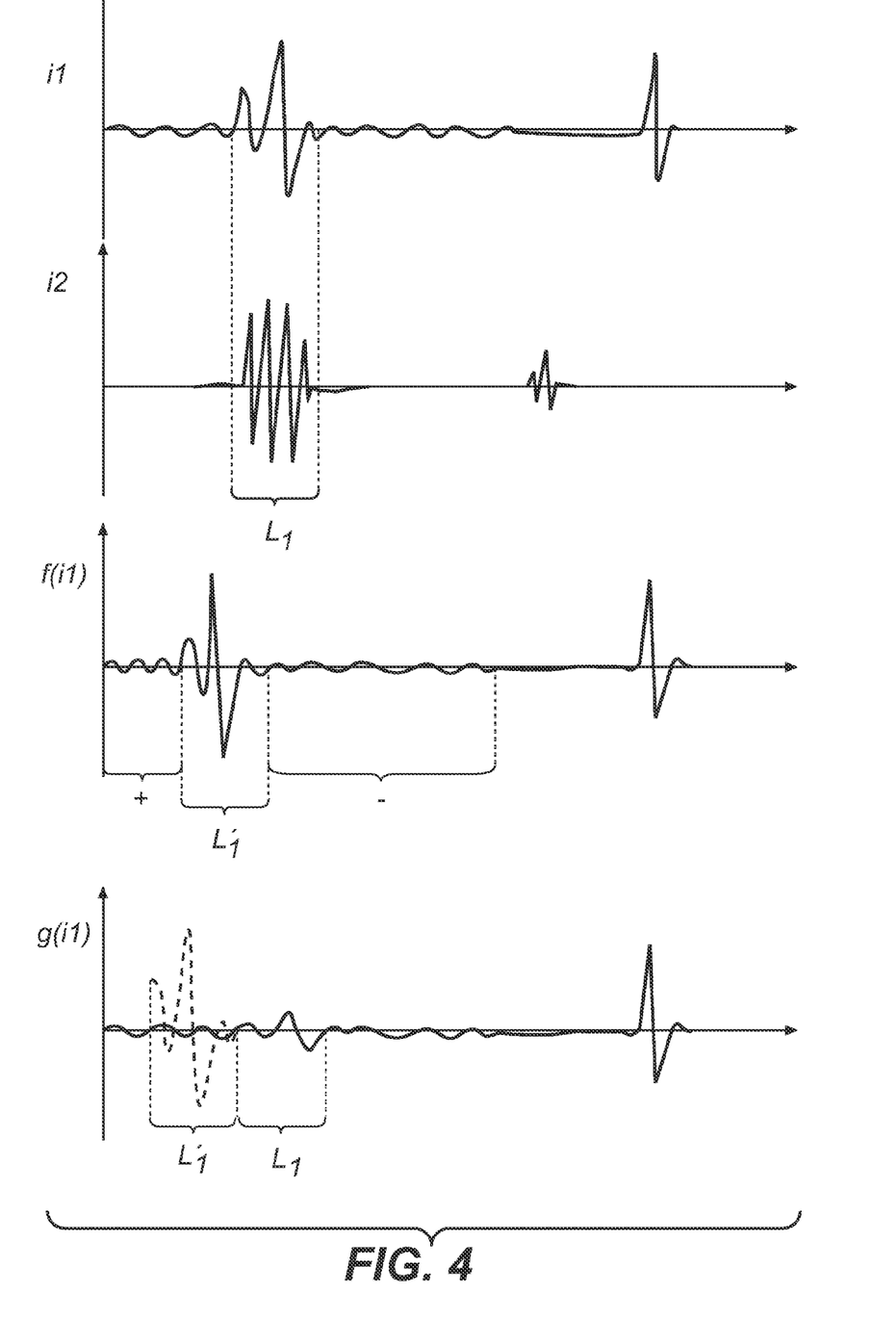
FIG. 4 is a waveform plot schematically illustrating a time segment with a talker collision, as well as two time-shift operations susceptible to preserve intelligibility despite the collision.

FIG. 4 illustrates the time shift technique in more detail, now with reference to time-dependent waveform plots of the signals in a different case than the one shown in FIG. 3. Both of first and second voice signals i1, i2 have high energy content in a time segment L1, and it is determined to shift the signal content of voice signal i1 backward in time, into time segment $L_1'$. The time shift may either proceed by time stretching or using a copy-and-paste technique.

The processed signal f(i1) illustrates the time stretching approach, wherein a positively stretched segment has been annotated with a plus sign, a negatively stretched segment has been annotated with a minus sign and the new location of the spectral content with L1. The time stretch is preferably gradual but may be non-gradual. Time stretching may or may not be applied to the signal content in L1. If time stretching is not applied to the signal content, the positive stretching may be completed before the time segment L1 (or equivalently $L_1'$) begins.

The processed signal g(i1) illustrates the copy-and-paste approach, wherein the signal content extracted from the segment $L_1$ has been drawn with dotted line in its new location $L_1'$, where it is added to the original signal content in that interval. Furthermore, the same signal content has been significantly attenuated in the segment $L_1$, down to approximately 25% of its original amplitude.

III. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of mixing voice signals while mitigating talker collisions between the voice signals, the method comprising:
   receiving two or more voice signals with a common time base;
   detecting a signal interval in which there is a talker collision between at least a first and a second voice signal out of said voice signals, wherein said detecting comprises:
      deriving a frequency-variable energy content indicator for each of the voice signals; and
      based on the energy content indicator, applying a detection condition including having comparable energy content in the first and the second voice signal in a talker collision location being a frequency sub-range in a signal interval;
   processing, in case of a positive detection result, the first voice signal of said voice signals with the aim of making it perceptually distinguishable, wherein the processing is restricted to time segments where it is needed; and
   mixing the at least one processed voice signal with the remaining voice signals in accordance with the common time base to obtain an output signal.

2. The method of claim 1, wherein the processing includes time-shifting the signal content of the detected signal interval of the first voice signal in relation to the common time base.

3. The method of claim 2, wherein the time-shifting includes applying a succession of positive and negative time stretching with respect to the common time base to the first voice signal.

4. The method of claim 2, wherein the time-shifting includes attenuating the signal content of the detected signal interval and copying the signal content of the detected signal interval to an adjacent signal interval.

5. The method of claim 1, wherein the processing includes frequency-shifting the signal content of the talker collision location.

6. The method of claim 5, wherein the frequency-shifting includes a gradual onset and/or gradual release.

7. The method of claim 2, wherein the processing affects only a frequency sub-range of the signal content in the detected signal interval.

8. The method of claim 2, further comprising, prior to shifting:
segmenting a portion of the first voice signal into phonemes; and
adjusting the detected signal interval to cover complete phonemes only.

9. The method of claim 1, wherein the processing includes time-shifting or frequency-shifting the signal content in time segments having a duration of the order of 0.1 s.

10. The method of claim 1, wherein the detection condition further includes having energy content above a predefined threshold both in the first and the second voice signal in the talker collision location.

11. The method of claim 1, wherein the voice signals are partitioned into time-frequency tiles, each associated with a value of the energy content indicator and being the basic detection unit.

12. The method of claim 1, further comprising electing the voice signal with least energy content in the detected signal interval as the first signal,
wherein the processing includes time-shifting or frequency-shifting the signal content of the detected signal interval and affects the first signal.

13. The method of claim 1, wherein:
the detection further includes finding at least one target location being a combination of a frequency sub-range and signal interval, which target location is close to the talker collision location and in which the detection condition fails; and
the processing includes time-shifting or frequency-shifting the signal content of the first signal into said target location.

14. The method of claim 13, wherein:
the detection further comprises finding at least two target locations and, for each target location, deriving a metric indicating the shift distance with respect to the talker collision location; and
the processing includes time-shifting or frequency-shifting the signal content of the first signal into that target location for which the metric is minimal.

15. The method of claim 14, wherein:
a first target location corresponds to a pure positive time shift or pure frequency shift and a second target location corresponds to a pure negative time-shift or pure frequency-shift, respectively; and
that target location for which the shift amount is minimal is selected.

16. The method of claim 1, further comprising processing a strict subset of the voice signals by applying an effect in the group comprising:
harmonic excitation;
an oscillating effect;
tremolo;
vibrato;
chorus;
flanging; and
phasing.

17. The method of claim 1, implemented in a live conferencing system.

18. A computer-readable medium storing computer-readable instructions for performing the method of any of the preceding claims.

19. A device for mixing voice signals, comprising:
an interface for receiving one or more voice signals with a common time base;
a collision detector for detecting a signal interval in which there is a talker collision between at least a first and a second voice signal out of said voice signals, wherein the collision detector is configured to:
derive a frequency-variable energy content indicator for each of the voice signals; and
based on the energy content indicator, apply a detection condition including having comparable energy content in the first and the second voice signal in a talker collision location being a frequency sub-range in a signal interval;
a processor for receiving a detection result from the collision detector and processing, in response to a positive detection result, at least one of the voice signals with the aim of making it perceptually distinguishable, wherein the processor is configured to restrict said processing to time segments where the processing is needed; and
a mixer for parsing the at least one processed voice signal and the remaining voice signals with respect to the common time base and mixing these signals accordingly to supply an output signal.

* * * * *